R. EMERSON.

Assignor to himself and H. H. MASON.

Harvester.

No. 7,976. Reissued Dec. 4, 1877.

Attest

W. F. Baker

L. A. Bunting

Inventor

Richard Emerson

By Coburn & Thacher

Attorneys.

N. PETERS, PHOTO-LITHOGRAPHER, WASHINGTON, D. C.

UNITED STATES PATENT OFFICE.

RICHARD EMERSON, OF SYCAMORE, ILLINOIS, ASSIGNOR TO HIMSELF AND HORATIO H. MASON.

IMPROVEMENT IN HARVESTERS.

Specification forming part of Letters Patent No. 179,287, dated June 27, 1876; Reissue No. 7,976, dated December 4, 1877; application filed October 6, 1876.

*To all whom it may concern:*

Be it known that I, RICHARD EMERSON, of Sycamore, in the county of De Kalb and the State of Illinois, have invented a new and useful Improvement in Harvesters, which is fully described in the following specification, reference being had to the accompanying drawings, in which—

Figure 1:
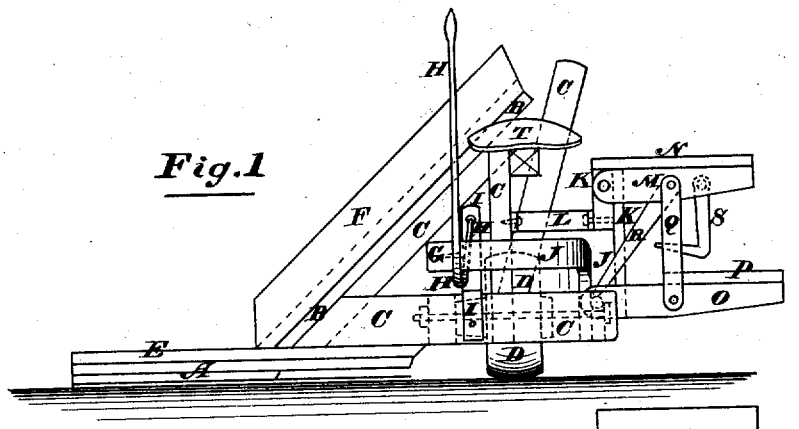
Figure 2:
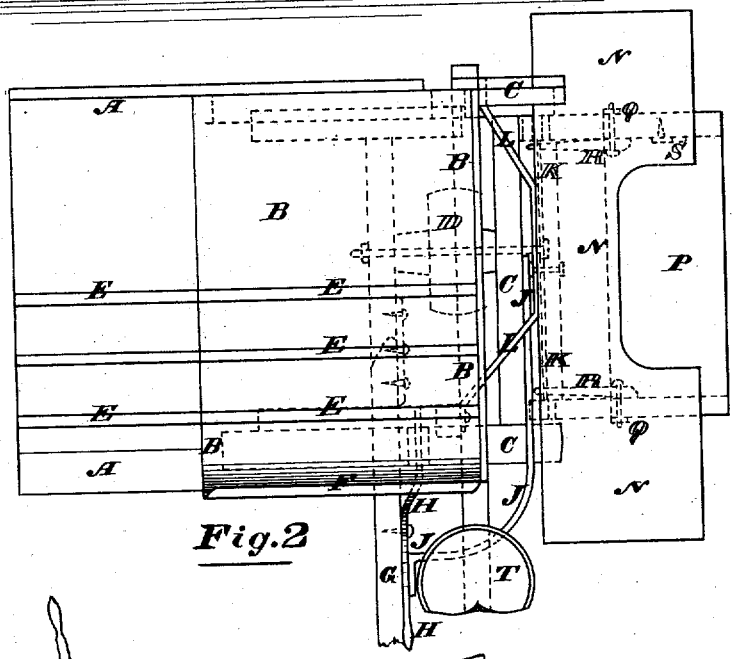
Figure 3:
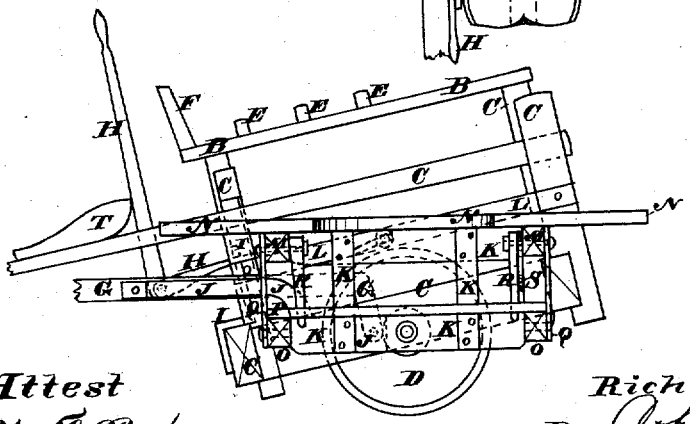

Figure 1 is a front elevation of a part of my improved harvester. Fig. 2 is a plan view of the same. Fig. 3 is an end elevation of the same on the stubble side of the machine.

My invention relates to that class of harvesters having a grain-elevating device and a binders' stand and tables, so that the cut grain may be delivered to and bound by attendants riding on the machine.

The invention consists in a binders' stand or platform hinged to the main or carrying frame of the machine, and attached to a brace which is connected to both the main frame and the tongue, the latter being also hinged so as to vibrate independently of the main frame; and it also consists in certain combinations of special devices, as will be hereinafter fully described and set forth.

In the drawings, A represents the grain-platform of a harvester; and B an inclined elevator-frame, up which the cut grain is carried by any suitable elevating rake mechanism, both platform and frame being connected to and supported by a suitable carrying-frame, C. The drive-wheel D is supported in suitable bearings mounted on the frame C, and the binders' table and platform are attached to this same frame by a pivotal connection, as will be presently described.

Transverse ribs E are attached to the platform A and to the incline B, upon which the cut grain rests, and between which the rake-teeth pass, so that all the cut grain may be taken and carried up by the elevating device.

To the front edge of the incline B is attached a board, F, to prevent the cut grain from scattering about while being carried up said platform.

G is the tongue, the rear end of which is hinged to the frame C forward of the main axle, so that the platform A can be tilted to bring the cutter-bar closer to or farther from the ground while the said tongue is held by the neck-yoke of the horses.

H is a lever, which is pivoted to the tongue G, and the rear arm of which passes through a hole in an upright, I, rigidly attached to the frame C, so that by operating the lever H the platform A may be tilted as required.

J is a curved brace, the forward end of which is pivoted to the tongue G. The rear part of the brace-bar J extends along and is pivoted to the side bar of the frame C nearly in line with the main axle, and to it is rigidly bolted the lower bar of an upright frame, K.

The upper bar of the frame K has a pin or bolt attached to it, which passes through a circular slot in the middle part of a brace-bar, L.

The ends of the bar L are bent inward, and are rigidly attached to the frame C. The bar L thus holds the frame K in an upright position, and at the same time does not interfere with the movement of the frame C as the platform A is tilted.

To the ends of the upper bar of the upright frame K are pivoted or hinged the ends of two bars or cleats, M, to which the binders' table N is secured. To the ends of the lower bar of the upright frame K are pivoted or hinged the ends of two bars or cleats, O, to which the binders' platform P is secured. The binders' platform O P is directly beneath the middle part of table M N, the rear middle part of said table M N being cut away, as shown in Fig. 2, to give space for the binders to stand when at work. Q are two connecting-bars, the lower ends of which are pivoted to the bars or cleats O of the binders' platform O P, and their upper ends are pivoted to the cleats M of the binders' table M N, so that the said table and platform may be made to move together when being turned up and down.

The table M N and the platform O P are supported, when lowered into a horizontal position, by the bars, braces, or legs R, the upper ends of which are pivoted to the cleats M by the same bolts that pivot the bars Q to said cleats. The lower ends of the braces R are rounded off, to enter holes in the lower bar of the upright frame K.

To one of the cleats M is pivoted a hook, S, which, which when the table M N and platform O P are turned up, is hooked upon the outer edge of the platform O P, to lock said table and platform in place. T is the driver's seat, which is attached to the projecting end of a bar of the frame C′, the driver balancing the binders on the axis of the drive-wheel.

It will be seen from the above description that the position of the binders' stand or platform is determined by that of the tongue; and that, as the tongue is hinged to the main or carrying frame, the latter may be tilted, and with it the cutting apparatus attached thereto, without disturbing the tongue.

The binders' stand being attached to the main frame by a pivotal connection, and being also connected by a pivoted bar to the tongue, it follows that any change in the relation between the hinged tongue and the main frame, caused by the tilting of the latter, will effect such a change in the position of the binders' stand that it will always be maintained in a substantially horizontal position, notwithstanding the circumstance that the pivots by means of which the tongue and binders' stand are connected to the main frame are not in line with each other.

This result is very desirable for the ease and convenience of the binders, which are also enhanced in my machine by attaching the binders' tables to the same support as the binders' stand, so that they all move together and preserve the same relative position.

Having thus described my invention, I claim as new and desire to secure by Letters Patent—

1. A suspended binders' frame attached to the main or carrying frame by a pivotal connection, in combination with a tongue independently hinged to the main frame, and mechanism connecting the tongue with the binders' stand, whereby a change in the angle between the tongue and the main frame will cause a differential change in the angle between the binders' frame and the main frame, substantially as described.

2. A suspended binders' frame attached to the main or carrying frame by a pivotal connection, in combination with a tongue vibrating upon a pivot on the main frame out of line with the connection of the binders' stand therewith, and having an independent connection to the latter, substantially as described.

3. A tilting or rocking main frame, in combination with a binders' stand attached thereto by a pivotal connection, a tongue hinged to the main frame out of line with the pivot of the binders' stand, and a brace-bar attached to both the tongue and binders' stand, substantially as described.

4. A tongue, G, hinged to the main frame in advance of the main axle, in combination with a binders' stand pivoted to the main frame about in line with the main axle and connected to the tongue, substantially as described.

5. A supporting bar or rail pivoted to the main frame about in line with the main axle, in combination with a binders' stand, P, hinged thereto, substantially as described.

6. The hinged tongue G, in combination with the binders' stand pivoted to the main frame, connecting-brace J, and binders' table N, arranged and operating substantially as described.

7. The combination of the upright frame K, the connecting-brace J, and tongue G, substantially as described.

8. The combination of the upright frame K, the braces J L, the frame C, and the tongue G, substantially as described.

9. The combination of the hinged binders' table M N with the upright frame K, the braces J L, the frame C, and the tongue G, substantially as shown and described.

10. The combination of the hinged binders' platform O P with the upright frame K, the braces J L, the frame C, and the tongue G, substantially as shown and described.

RICHARD EMERSON.

Witnesses:
SHUBAEL T. ARMSTRONG,
EUNICE E. ARMSTRONG.